WILLIAM A. LEWIS. Improvement in Apparatus for Welding.
No. 119,865. Patented Oct. 10, 1871.

ATTEST. INVENTOR.

UNITED STATES PATENT OFFICE.

WILLIAM ARNOLD LEWIS, OF CHICAGO, ILLINOIS, ASSIGNOR TO HOLLOW-AXLE MANUFACTURING COMPANY, OF MISHAWAKA, INDIANA.

IMPROVEMENT IN APPARATUS FOR WELDING.

Specification forming part of Letters Patent No. 119,865, dated October 10, 1871.

*To all whom it may concern:*

Be it known that I, WILLIAM ARNOLD LEWIS, of Chicago, in the State of Illinois, have invented a new and improved apparatus for welding and swaging bodies of iron and steel, of which the following is a specification:

This invention consists in providing an apparatus by which articles can be welded together, and, if necessary, swaged into required shape by pressure applied without removing the said articles from the heat or atmosphere of the furnace or oven where they are heated. To this end I arrange a die-press at or within the furnace or oven-mouth in such position that the articles to be welded or shaped can readily be placed within or between the dies while still exposed to the heat. The pressure upon the dies is preferably produced by toggle-jointed levers, actuated by connecting-rods and cranks in such a manner that a powerful and positive force may be promptly applied.

Figure 1:
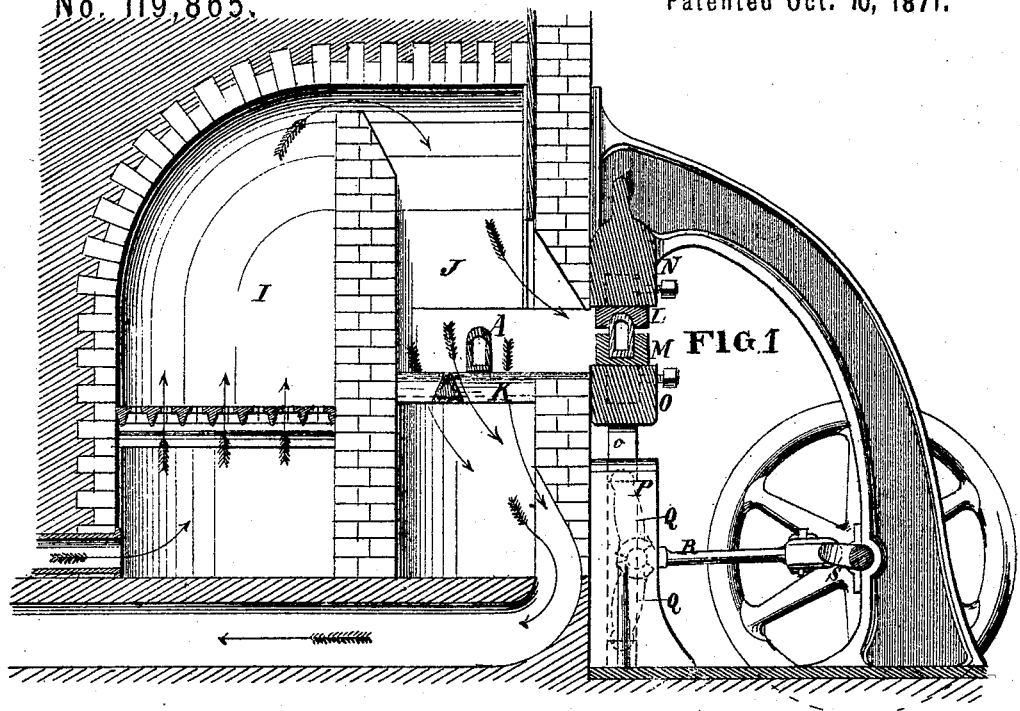
Figure 2:
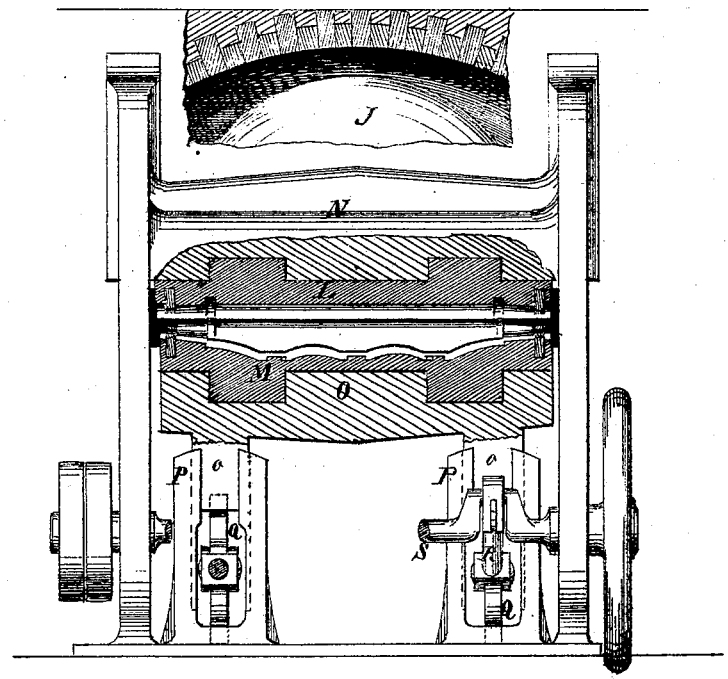

Figure 1 is a transverse sectional view of the furnace, oven, dies, and press. Fig. 2 is a longitudinal section of the same on a plane passing through the center of the die-box.

I represents a reverberatory furnace, and J the oven part thereof, in which the parts of the body to be welded are placed for heating, as shown at A, in Fig. 1, resting upon bars K. The said bars taper toward their upper edges, and are made of metal covered with fire-clay. The arrows indicate the course of the air and of the gaseous products of combustion by which the heat is communicated to the body to be welded or shaped. L and M are a pair of dies, the former attached to the stationary frame N and the latter mounted on a movable bed-plate, O, which is constructed with guides o adapted to slide between suitable ways P, and is thrown upward by toggle-jointed levers Q, which may be operated by the crank-shaft S and connecting-rod R, or other means. The dies are formed of any proper shape to impart the desired contour to the finished article.

The body of the metal which is to be swaged into any desired shape, or the parts to be welded, having been adjusted with their edges together and suitably wired, are placed in the oven J, Fig. 1, until their temperature is raised to the welding point. They are then drawn and placed on the die M, which latter is immediately forced up by the mechanism hereinbefore described, or by other suitable means, the effect of which is to weld and swage the parts into a homogeneous hollow body of metal, the body, as it will be seen, being all the time exposed to the heat of the furnace. The dies are then again opened and the finished article removed therefrom.

I claim as my invention—

1. The combination and arrangement of the furnace I, oven J, and dies L M, substantially herein represented and described, and for the purposes set forth.

2. The combination of the dies L M, frame N, bed-plate O, guide-ways P, and operating devices Q R S with the heating-furnace or oven, substantially as and for the purposes set forth.

WM. A. LEWIS.

Witnesses:
OCTAVIUS KNIGHT,
WALTER ALLEN.

(60)